Aug. 22, 1950     D. F. DRIESCHMAN     2,519,445
METHOD OF MAKING ELECTRODES
Original Filed Aug. 31, 1943     2 Sheets-Sheet 1
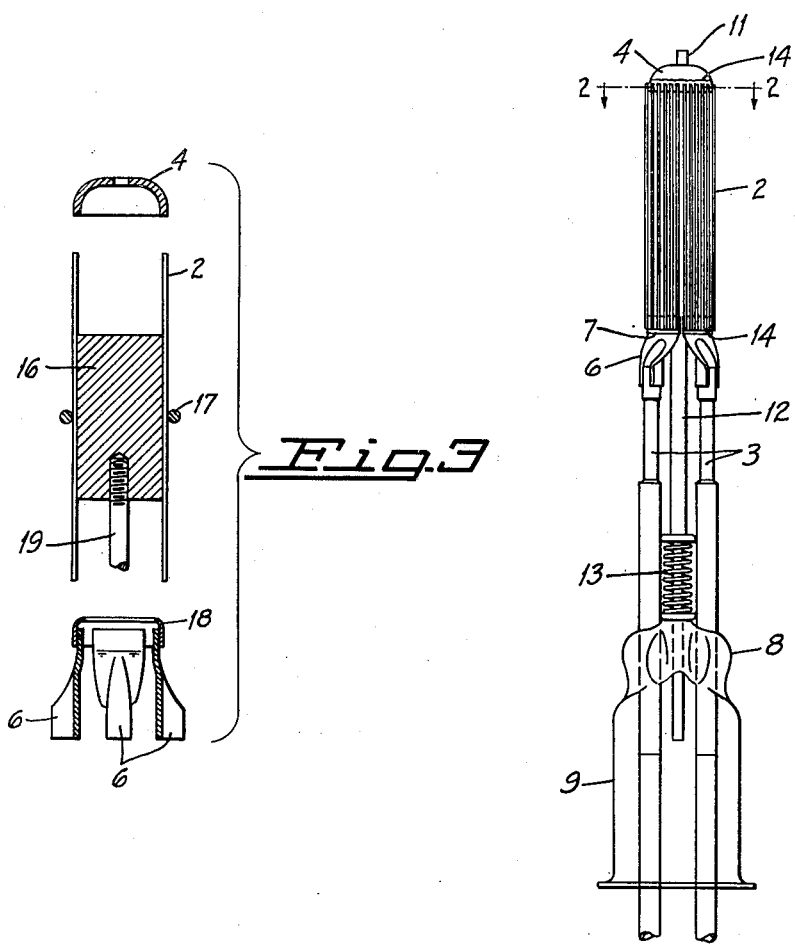
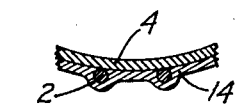
INVENTOR.
Donald F. Drieschman
BY
HIS ATTORNEY

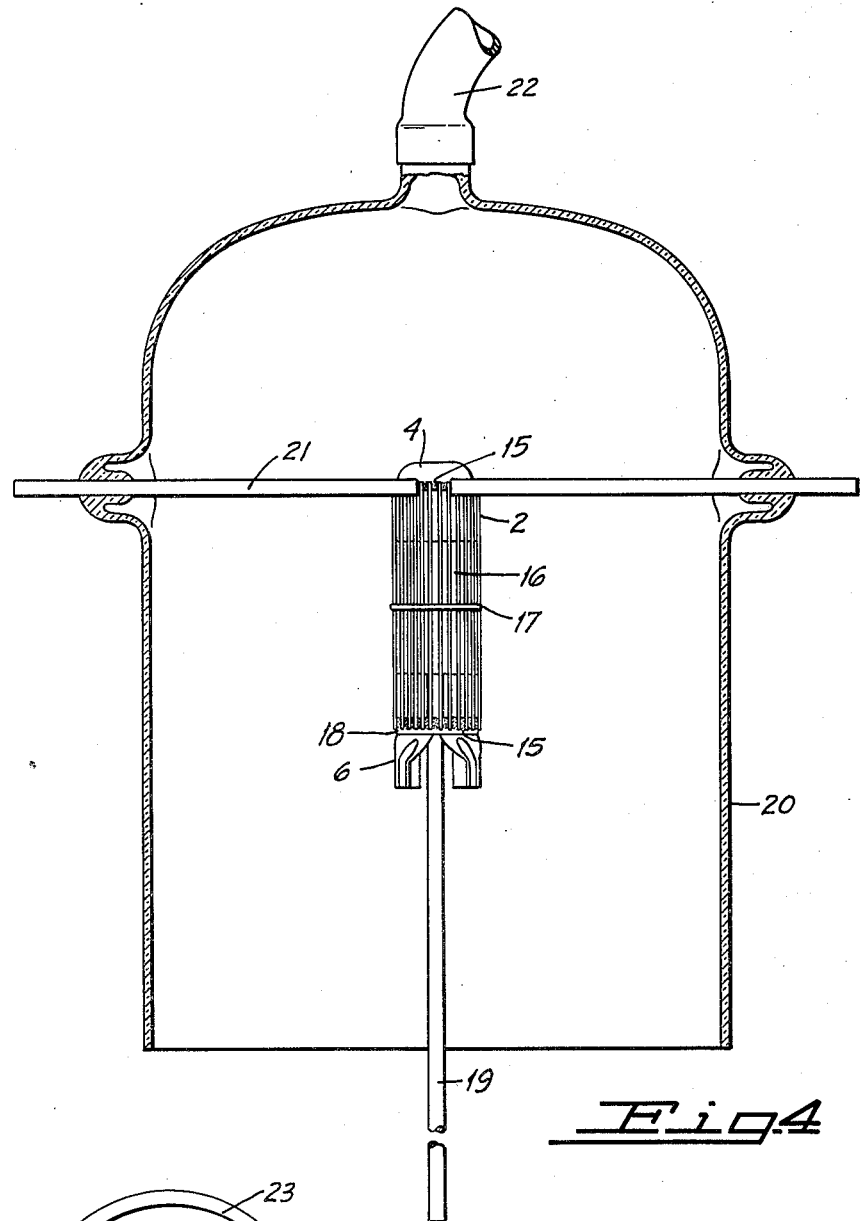
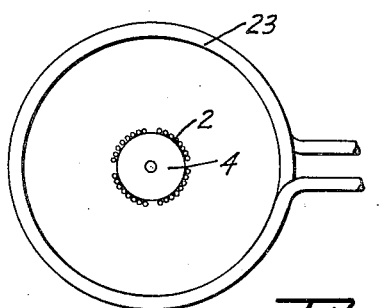

Patented Aug. 22, 1950

2,519,445

UNITED STATES PATENT OFFICE 2,519,445

METHOD OF MAKING ELECTRODES

Donald F. Drieschman, Los Altos, Calif., assignor to Eitel-McCullough, Inc., San Bruno, Calif., a corporation of California Original application August 31, 1943, Serial No. 500,717. Divided and this application May 24, 1947, Serial No. 750,239

1 Claim. (Cl. 29—25.17)

This is a division of parent application Serial No. 500,717, now abandoned, which parent application discloses an improved welded joint adapted for use in the fabrication of electrodes such as cathodes for vacuum tubes. The claims in the parent application are directed to the welded joint, and the claim of this divisional application are directed to the method of making an electrode. Another divisional application Serial No. 552,310, now Patent No. 2,442,163, granted May 25, 1948, contains claims directed to the electrode structure.

It is among the objects of my invention to provide an improved method of assembling and welding an electrode such as a cathode.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claim.

Referring to the drawings:

Figure 1 is a side elevational view of a cathode structure made by my improved method; and Figure 2 is an enlarged detail sectional view taken in a plane indicated by line 2—2 of Figure 1.

Figure 3 is an exploded vertical sectional view of the cathode and assembly jig.

Figure 4 is a vertical sectional view of a cathode in a bell jar ready for arc welding.

Figure 5 is a plan view of a modified arrangement for welding, using a high frequency coil.

In terms of broad inclusion, my method of making an electrode comprises arranging a metallic element, such as a filament wire, with an end adjoining a metal support, coating the joint with a paste containing particles of a metallic welding material, and then subjecting the joint to sufficient heat to melt the particles to weld the element to the support. In the case of a cathode structure the filament wires are preferably arranged about a cylindrical core, which core is removed after the coating and heating steps. In order to divide one end of the cathode into sections, and to facilitate removal of the core, I prefer to sever the support between certain of the filament wires after the welding operation.

In greater detail, and referring to the drawings, my improvements are illustrated in conjunction with an electrode for a vacuum tube, and more particularly to a cathode structure.

As shown in Figures 1 and 2, the cathode comprises a multiplicity of say 40 parallel wires 2 of thoriated tungsten divided into four groups disposed in cylindrical formation about the cathode axis, each group of wires being connected at the lower end to one of the four tungsten cathode leads 3 and all being connected at the upper end to a common terminal 4.

Fixed supports for the lower ends of the filament wires are provided by brackets 6 welded to the leads and to quadrant sections 7 having arcuate rims to which the groups of filament wires are welded. Leads 3 are sealed in a fourway press 8 on a suitable stem 9 of glass or the like. The upper support or terminal 4 is a cap having a circular rim to which the upper ends of the filament wires are welded. These upper and lower supports are of a refractory metal such as tantalum or molybdenum, tantalum being preferred.

Top cap 4 provides a movable support and is held centered by a tungsten rod or standard 11 sealed to the stem and projecting through the cap. Tension is uniformly applied to all the filament wires by a sleeve 12 slidable along the center rod and urged upwardly against cap 4 by a spring 13 interposed between the sleeve and stem.

In the final tube diametrically opposed cathode leads 3 are connected in parallel to a source of heating current. Since two of the groups of filament wires are connected in series with one pair of leads and the other two groups are connected in series with the other two leads, all of the filament wires are simultaneously heated. This structure has the advantage of compacting a multiplicity of filament wires in a relatively small circle, whereby a large amount of electron emitting surface is made available.

The main problem in fabricating such a structure is, of course, securing the ends of the filament wires to the supporting members. Ordinary spot welding practice is not feasible because of the close spacing between the wires. I have solved the problem by a special welding material and welding technique, resulting in the formation of a bonding medium or layer 14 in which the filaments are embedded. See Figure 2. This layer preferably comprises an alloy composed of a major proportion of columbium and a minor proportion of ruthenium, the preferred proportions being about 4% to 20% by weight of ruthenium and the balance columbium. Other refractory metals such as tantalum may be substituted in whole or in part for the columbium component of the alloy. Likewise other metals in group 8 of the periodic table may be substituted for the ruthenium component. However, the columbium-ruthenium composition is superior in many respects and is preferred. This alloy has a high melting point, low vapor pressure, is very hard and makes an excellent bond between refractory metals such as tungsten and the like. These properties make the alloy especially suited for a joint structure in a cathode where exceedingly high temperatures are involved.

The preferred method of making the cathode utilizes a jig (Figure 3) comprising a cylindrical core 16 of say copper having longitudinal grooves in the surface to receive filament wires 2, the latter being straight, rod-like pieces cut to size. These wires are temporarily held by a rubber band 17; core 16 being proportioned so that wires 2 project freely from the ends. At this stage of fabrication the quadrant sections on brackets 6 are formed as a one-piece ring 18 which is later severed at four places to make the individual quadrants. Ring 18 is inserted at the lower end of the jig-held filament wires and top cap 4 is inserted at the upper end, the jig core being sized to hold wires 2 in a circle slightly smaller in diameter than that of the end supports so that the latter are held by press fit during the welding operation. As shown in Figure 4, a handle 19 is threaded into core 16 to permit moving the assembled cathode up into a bell jar 20 for welding purposes.

The welding material used to produce the preferred bonding alloy at the weld comprises a mixture of finely divided particles of columbium and ruthenium. The columbium particles should not be larger than about 200 mesh, a particle size of around 400 mesh being preferred. The ruthenium particles used are preferably still more finely divided, a powder known commercially as "ruthenium black" being preferred. These particles are mixed together with a liquid vehicle, such as water, to a thin pasty consistency suitable for application with a brush. This welding material is then brushed onto the rims of the supports and over the end portions of the filament wires as shown at 15 in Figure 4.

With the welding material applied the assembled cathode is then elevated in bell jar 20 to position the upper support near an electric arc discharging between electrodes 21 sealed to the sides of the bell jar. Rotation of the cathode by the operator exposes successive portions of the rim to the intense heat of the arc. After finishing the top weld the structure is moved up to weld the filaments at the lower support. A non-oxidizing atmosphere is maintained in the bell jar by admitting a gas, such as hydrogen, through a suitable duct 22.

In making these welds I find that the welding material melts and flows out uniformly and smoothly over the joint. The ruthenium performs an important function at this stage, serving as a wetting agent and to give uniform spreading of the material over the surfaces. The final composition formed by the columbium and ruthenium is a hard, tough alloy having good bonding affinity for other refractory metals such as the tungsten filaments 2 and tantalum supports 4 and 18. These properties insure strong mechanical joints at the ends of the filaments. Furthermore, the high melting point and low vapor pressure of the bonding medium produces a weld which will readily withstand the incandescent operating temperatures of the filament wires.

Instead of using an arc the heat required for making the weld may be supplied by high frequency induction, using a coil 23 as shown in Figure 5; this coil being positioned in a suitable bell jar so that the non-oxidizing atmosphere may be supplied. The assembled cathode on the jig is elevated to place the desired portions of the cathode within the coil, whereupon the coil is energized to induce the required amount of heat. Since lower support 18 is a continuous ring at this time the induction heating method may be used at the bottom as well as at the top welds.

After the welds are completed ring 18 of the lower support is cut in four places between brackets 6 to separate it into the quadrant sections 7 shown in Figure 1. Jig core 16 is then removed by spreading the lower end of the cathode. The cathode is now ready for final mounting, together with the spring tensioning device, on stem 9.

While I have described my improvements particularly in connection with a cathode it is understood that the method may be used in connection with other electrodes such as grids in which wires are welded to end supports.

I claim:

The method of making a cathode structure which comprises assembling parallel filament wires on and lengthwise of a cylindrical core with ends of the wires adjoining the rim of a metal support to form therewith a joint, coating the joint with a paste containing particles of a metallic welding material, subjecting the joint to sufficient heat to melt the particles to weld the wires to the support, severing the support between certain of said filament wires and then removing the core.

DONALD F. DRIESCHMAN.

REFERENCES CITED

The following references are of record in the file of this patent:

UNITED STATES PATENTS

| Number | Name | Date |
| --- | --- | --- |
| 401,444 | Lemp et al. | Apr. 16, 1889 |
| 2,232,176 | Guthrie | Feb. 18, 1941 |
| 2,339,402 | Herzog | Jan. 18, 1944 |
| 2,391,969 | Herzog | Jan. 1, 1946 |
| 2,400,082 | Eitel et al. | May 14, 1946 |
| 2,402,029 | Dinnick et al. | June 11, 1946 |
| 2,433,339 | Brown | Dec. 30, 1947 |